United States Patent
Xia et al.

(10) Patent No.: US 9,665,511 B2
(45) Date of Patent: May 30, 2017

(54) METHOD, UPPER COMPUTER AND SYSTEM FOR PROGRAMMING NODES IN A BUS NETWORK

(71) Applicants: SHENZHEN BYD AUTO R & D COMPANY LIMITED, Guangdong (CN); BYD COMPANY LIMITED, Guangdong (CN)

(72) Inventors: Huan Xia, Shenzhen (CN); Junlin Gong, Shenzhen (CN); Xiaohua Tang, Shenzhen (CN); Xiaofeng Shen, Shenzhen (CN); Xinghui Wang, Shenzhen (CN); Chao Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 308 days.

(21) Appl. No.: 14/409,467

(22) PCT Filed: Jun. 21, 2013

(86) PCT No.: PCT/CN2013/077628
§ 371 (c)(1),
(2) Date: Dec. 18, 2014

(87) PCT Pub. No.: WO2013/189304
PCT Pub. Date: Dec. 27, 2013

(65) Prior Publication Data
US 2015/0193362 A1    Jul. 9, 2015

(30) Foreign Application Priority Data

Jun. 21, 2012 (CN) .......................... 2012 1 0207217

(51) Int. Cl.
*G06F 13/36* (2006.01)
*G06F 9/44* (2006.01)
(Continued)

(52) U.S. Cl.
CPC .......... *G06F 13/28* (2013.01); *G06F 13/4027* (2013.01); *G06F 13/4282* (2013.01);
(Continued)

(58) Field of Classification Search
None
See application file for complete search history.

(56) References Cited

U.S. PATENT DOCUMENTS

2006/0083173 A1    4/2006    Jordan et al.
2006/0095146 A1    5/2006    Hesse et al.
(Continued)

FOREIGN PATENT DOCUMENTS

| CN | 101359317 A | 2/2009 |
| CN | 101655802 A | 2/2010 |
| CN | 102301654 A | 12/2011 |

OTHER PUBLICATIONS

European Patent Office (EPO) Search Report for 13806802.8 Jan. 28, 2016 pp. 1-9.

*Primary Examiner* — Hyun Nam
(74) *Attorney, Agent, or Firm* — Anova Law Group, PLLC (57) ABSTRACT

A method, an upper computer and a system for programming nodes in a bus network are provided. The method comprises: analyzing a program file to be programmed to obtain data of the program file and a storage address corresponding to the data; broadcasting a routing request message and receiving responding messages returned from a plurality of lower computers, each lower computer corresponding to one node in the bus network; analyzing the responding messages to obtain an operating state of each node among the plurality of layers of nodes; receiving a selected node to be programmed, activating the selected node and transmitting the data and the storage address to a single chip microcomputer corresponding to the selected node when the operating state
(Continued)

of each node is a forwarding state; and storing corresponding to the selected node the data in a memory of the single chip microcomputer according to the storage address.

16 Claims, 4 Drawing Sheets

(51) Int. Cl.
*G06F 13/28* (2006.01)
*H04L 12/40* (2006.01)
*G06F 13/40* (2006.01)
*G06F 13/42* (2006.01)
*H04L 12/24* (2006.01)
*H04L 12/26* (2006.01)

(52) U.S. Cl.
CPC ...... *H04L 12/40169* (2013.01); *H04L 41/082* (2013.01); *H04L 43/0817* (2013.01); *H04L 2012/40215* (2013.01); *H04L 2012/40273* (2013.01)

(56) References Cited

U.S. PATENT DOCUMENTS

| | | |
|---|---|---|
| 2010/0106324 A1 | 4/2010 | Grohman |
| 2012/0069852 A1 | 3/2012 | Shinomiya |

METHOD, UPPER COMPUTER AND SYSTEM FOR PROGRAMMING NODES IN A BUS NETWORK

CROSS-REFERENCES TO RELATED APPLICATIONS

This application is a national phase entry under 35 U.S.C. §371 of International Application No. PCT/CN2013/077628,filed on Jun. 21, 2013, which claims the priority to and benefits of Chinese patent application No. 201210207217.0, filed with the State Intellectual Property Office of P.R.C. on Jun. 21, 2012, the entire contents of all of which are incorporated herein by reference.

FIELD OF THE INVENTION

The present disclosure relates to the field of device programming and, more particularly to, a method, an upper computer and a system for programming nodes in a bus network.

BACKGROUND

Currently, because of lack of resources, electric vehicles as new energy traffic vehicles are booming. Batteries as energy supply source of the electric vehicle become especially important, and accordingly software battery management systems become core of the electric vehicle.

Figure 1:
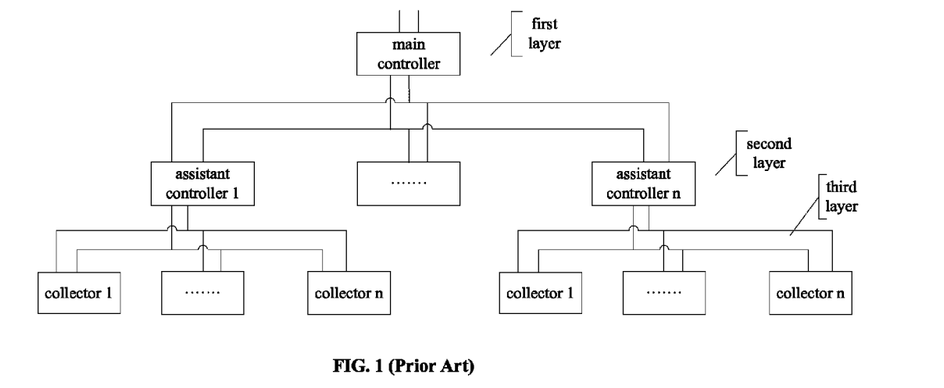
FIG. 1 is a block diagram of a conventional distributed battery management system.

Due to the large number of the batteries, the battery management system adopts a distributed structure. FIG. 1 is a block diagram of a conventional distributed battery management system. As shown in FIG. 1, the distributed battery management system comprises a plurality of layers of nodes, where a third layer comprises a plurality of collectors; a second layer comprises a plurality of assistant controllers; a first layer comprises a main controller; and individual layers are connected via a CAN (Controller Area Network) bus. For carrying out the management, each node needs to be programmed. A conventional programming method is carrying out the software programming one to one, which needs to connect with the main control CAN network when the CAN programs a main controller program, needs to connect with the assistant control CAN network when the CAN programs an assistant controller program, and needs to connect with the collector network when the CAN programs a collector program.

The problem of the conventional software programming is, when the distributed battery management system is installed in a vehicle, the entire battery management system only has one diagnosing interface, and thus the method of one-to-one software programming can only program the main controller program, but cannot update the assistant controller program and the collector program. Therefore, if the assistant controller program and the collector program need to be updated, the distributed battery management system should be uninstalled, which brings inconvenience to the debug and updating of the software.

BRIEF SUMMARY OF THE DISCLOSURE

Embodiments of the present disclosure seek to solve at least one of the problems existing in the prior art.

According to a first aspect of the present disclosure, a method for programming nodes in a bus network is provided. The bus network comprises a plurality of layers of nodes and the method comprises steps of: analyzing by an upper computer a program file to be programmed to obtain data of the program file and to obtain a storage address corresponding to the data; broadcasting by the upper computer a routing request message and receiving responding messages returned from a plurality of lower computers, in which each lower computer corresponds to one node in the bus network; analyzing by the upper computer the responding messages to obtain an operating state of each node among the plurality of layers of nodes; receiving a selected node to be programmed, activating the selected node and transmitting the data and the storage address to a single chip microcomputer corresponding to the selected node when the operating state of each node is a forwarding state; and storing by the lower computer corresponding to the selected node the data in a memory of the single chip microcomputer according to the storage address.

With the disclosed method of the programming nodes in the bus network according to an embodiment of the present discourse, by adding the function of the routing communication for the bus network and using mutual communication between the upper computer and the lower computers to achieve the point-to-point programming, strong anti-interference ability and simple programming are realized, and time and cost are saved, and subsequent software updating and maintenance are convenient since individual nodes do not need to be programmed separately during the programming process.

According to a second aspect of the present disclosure, a system for programming nodes in a bus network is provided. The bus network comprises a plurality of layers of nodes, and the system comprises: an upper computer, in which the upper computer is configured to analyze a programming file to be programmed to obtain data of the program file and to obtain a storage address corresponding to the data, to broadcast a routing request message and receive responding messages returned from a plurality of lower computers, to analyze the responding messages to obtain an operating state of each node among the plurality of layers of nodes, and to receive a selected node to be programmed, activate the selected node and transmit the data and the storage address to a single chip microcomputer corresponding to the selected node when the operating state of each node is a forwarding state; and a plurality of lower computers, in which each lower computer corresponds to one node in the bus network, and is configured to receive the routing request message sent by the upper computer and to return the responding message according to the routing request message, and to store the data in a memory of the single chip microcomputer according to the storage address.

With the disclosed system for programming nodes in the bus network according to an embodiment of the present discourse, by adding the function of the routing communication for the bus network and using mutual communication between the upper computer and the lower computers to achieve the point-to-point programming, a strong anti-interference ability and a simple programming are realized, and a time and a cost are saved and a later software updating and maintenance are convenient since individual nodes do not need to be programmed separately during the programming process.

According to a third aspect of the present disclosure, an upper computer for programming nodes in a bus network is provided. The bus network comprises a plurality of layers of nodes. The upper computer is configured to: analyze a program file to be programmed to obtain data of the program file and to obtain a storage address corresponding to the data, broadcast a routing request message and receive responding messages returned from a plurality of lower computers, analyze the responding messages to obtain an operating state of each node among the plurality of layers of nodes; and receive a selected node to be programmed, activate the selected node and transmit the data and the storage address to a single chip microcomputer corresponding to the selected node when the operating state of each node is a forwarding state, in which the plurality of lower computers each corresponds to one node in the bus network.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure may be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure may become apparent and more readily appreciated from the following descriptions made with reference to the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The method for programming nodes in a bus network according to an embodiment of the present disclosure is described below in detail with reference to FIG. 2.

Figure 2:
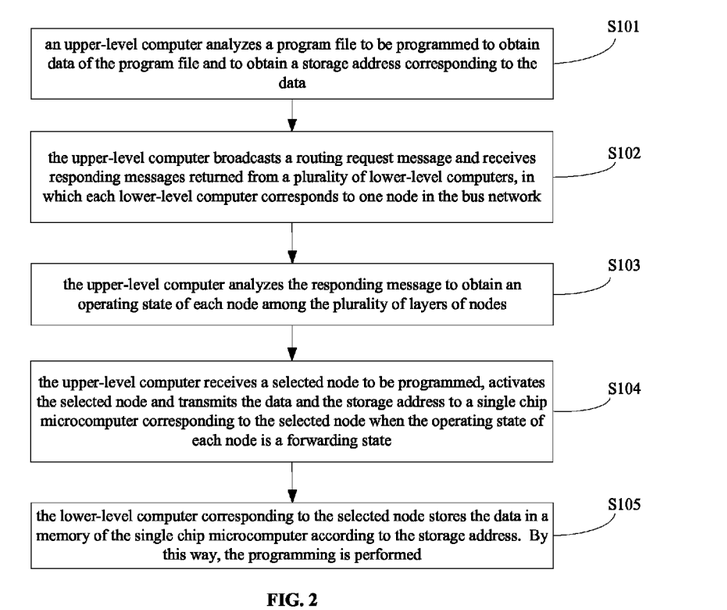
FIG. 2 is a flow chart of a method for programming nodes in a bus network according to an embodiment of the present disclosure.

FIG. 2 is a flow chart of a method for programming nodes in a bus network according to an embodiment of the present disclosure. As shown in FIG. 2, the method for programming nodes in the bus network comprises the following steps.

Step S101, an upper computer analyzes a program file to be programmed to obtain data of the program file and to obtain a storage address corresponding to the data.

In one embodiment, the upper computer is a user operation interface. A user can control the programming process by the upper computer. For example, the program file to be programmed is a S19 file in a format of:

| Type | Byte number | Storage address | Data | Sum check code |

Because the programming only needs the storage address and the data, the upper computer needs to analyze the program file, to obtain the data and the storage address corresponding to the data in the program file.

Step S102, the upper computer broadcasts a routing request message and receives responding messages returned from a plurality of lower computers, in which each lower computer corresponds to one node in the bus network.

For example, for a distributed battery management system of an electric vehicle, the bus network comprises three layers of nodes, where a third layer comprises a plurality of collectors; a second layer comprises a plurality of assistant controllers; and a first layer comprises a main controller. Each collector or controller corresponds to one single chip microcomputer. Each single chip microcomputer corresponds to one lower computer, and the lower computer is an introductory program of the single chip microcomputer.

Step S103, the upper computer analyzes the responding message to obtain an operating state of each node among the plurality of layers of nodes.

In one embodiment, the bus network has a function of routing communication, so that the upper computer and the lower computers can be communicated through the routing message. In this way, the upper computer can realize the operating state of each node. Specifically, the operating state of each node in the bus network comprises a forwarding state and a programming state. In the forwarding state, a node only forwards the communication message and doesn't receive the data in the communication message. In the programming state, the node only receives the data in the communication message without forwarding the communication message.

Step S104, the upper computer receives a selected node to be programmed, activates the selected node and transmits the programming data and the storage address to a single chip microcomputer corresponding to the selected node, when the operating state of each node in the bus network is in a forwarding state.

It should be understood that, the programming only can be performed after the success of distributed network routing, and the operation interface of the upper computer can display each node. In this way, the user can directly choose the node to be programmed in the distributed bus network, and only the chosen node can be activated and programmed. The other nodes which the user doesn't choose are in the forwarding state, and do not receive the programming data.

Step S105, the lower computer corresponding to the selected node stores the programming data in a memory of the single chip microcomputer according to the storage address. By this way, the programming is performed on the selected node.

With the disclosed method of programming nodes in the bus network according to an embodiment of the present discourse, by adding the function of routing communication for the bus network and using mutual communication between the upper computer and the lower computers to achieve the point-to-point programming, a strong anti-interference ability and simple programming can be realized, and time and cost are saved, and subsequent software updating and maintenance are convenient because individual nodes do not need to be programmed separately during the programming process.

Figure 3:
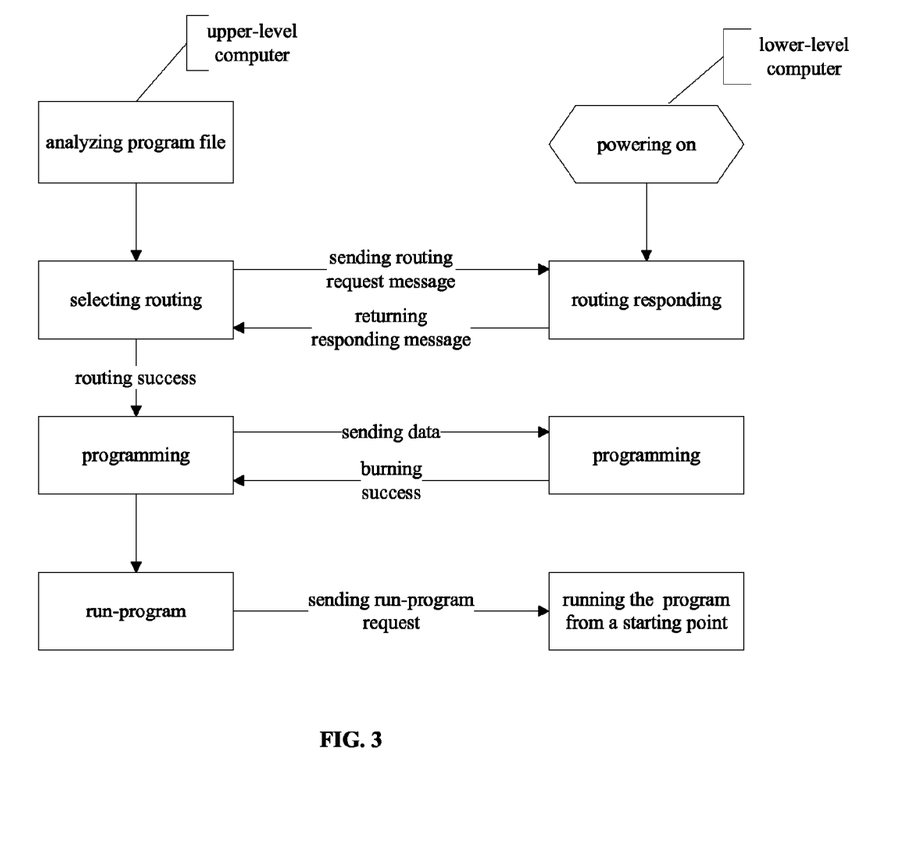
FIG. 3 is a schematic flow chart of a method for programming nodes in a bus network according to an embodiment of the present disclosure.
Figure 4:
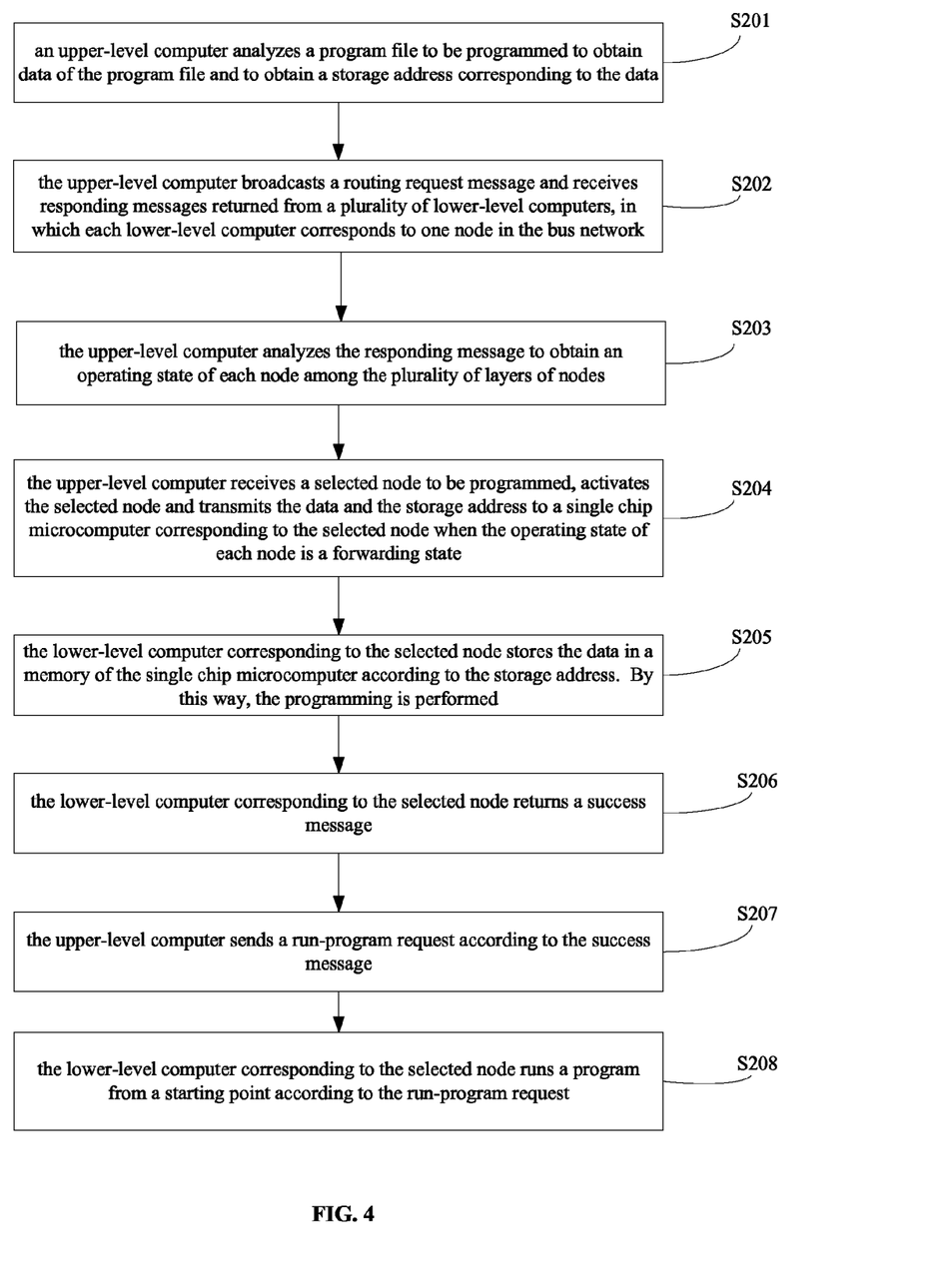
FIG. 4 is a flow chart of a method for programming nodes in a bus network according to an embodiment of the present disclosure.

FIG. 3 is a schematic flow chart of a method for programming nodes in a bus network according to an embodiment of the present disclosure. FIG. 4 is a flow chart of a method for programming nodes in a bus network according to an embodiment of the present disclosure. As shown in FIG. 3 and FIG. 4, the method for programming nodes in the bus network comprises the following steps.

Step S201, an upper computer analyzes a program file to be programmed to obtain programming data of the program file and to obtain a storage address corresponding to the programming data.

Step S202, the upper computer broadcasts a routing request message and receives responding messages returned from a plurality of lower computers, in which each lower computer corresponds to one node in the bus network.

Step S203, the upper computer analyzes the responding message to obtain an operating state of each node among the plurality of layers of nodes.

Step S204, the upper computer receives a selected node to be programmed, activates the selected node and transmits the data and the storage address to a single chip microcomputer corresponding to the selected node when the operating state of each node is in the forwarding state.

Step S205, the lower computer corresponding to the selected node stores the programming data in a memory of the single chip microcomputer according to the storage address. By this way, the programming is performed on the selected node.

The specific executing processes of Steps S201 to S205 are similar to those of Steps S101 to S105, so a detailed description thereof is not provided here.

Step S206, the lower computer corresponding to the selected node returns a success message.

After the success of Step S205, that is, the programming is successful, the lower computer corresponding to the selected node returns the success message, and thus the subsequent steps can be performed. On the other hand, if the programming is failed, the lower computer returns the programming failure message to remind the user to perform maintenance.

Step S207, the upper computer sends a run-program request according to the success message.

Step S208, the lower computer corresponding to the selected node runs the program at a starting point according to the run-program request.

For example, after the programming is successful, a user clicks the "run program" button on the operation interface of the upper computer. The upper computer sends the run-program request to the selected lower computer, and the lower computer runs the program at a starting point after receiving the run-program request.

With the disclosed method for programming nodes in the bus network according to an embodiment of the present discourse, the upper computer and the lower computers mutually control the program running, thus ensuring the normal running of the subsequence programming.

It should be understood that, the method for programming nodes in the bus network according to embodiments of the present discourse can be applied in various kinds of bus networks, such as a CAN network, a SCI (serial communication interface) network, and so on.

According to an embodiment of the present disclosure, a system for programming nodes in a bus network is also provided.

Figure 5:
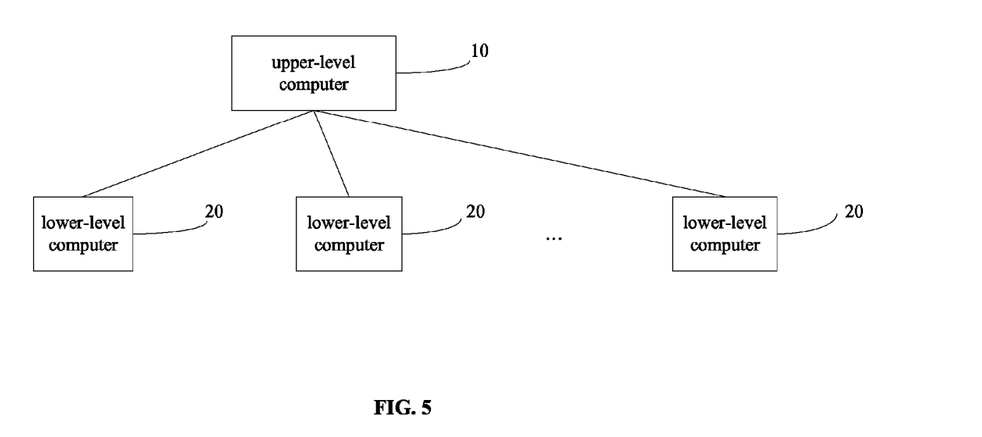
FIG. 5 is a block diagram of a system for programming nodes in a bus network according to an embodiment of the present disclosure.

FIG. 5 is a block diagram of a system for programming nodes in a bus network according to an embodiment of the present disclosure. As shown in FIG. 5, the system for programming nodes in the bus network comprises an upper computer 10 and a plurality of lower computers 20.

The upper computer 10 is configured to analyze a program file to be programmed to obtain data of the program file and to obtain a storage address corresponding to the data, to broadcast a routing request message and receive responding messages returned from a plurality of lower computers, to analyze the responding messages to obtain an operating state of each node among the plurality of layers of nodes, and to receive a selected node to be programmed, activate the selected node and transmit the data and the storage address to a single chip microcomputer corresponding to the selected node when the operating state of each node is a forwarding state.

Each lower computer 20 corresponds to one node in the bus network, and is configured to receive the routing request message sent by the upper computer 10 and to return the responding message according to the routing request message, and to store the data in a memory of the single chip microcomputer according to the storage address.

With the disclosed system for programming nodes in the bus network according to an embodiment of the present discourse, by adding the function of the routing communication for the bus network and using mutual communication between the upper computer and the lower computers to achieve the point-to-point programming, a strong anti-interference ability and simple programming are realized, and time and cost are saved and subsequent software updating and maintenance are convenient because individual nodes do not need to be programmed separately during the programming process.

In one embodiment, the upper computer 10 is further configured to send a run-program request according to a success message returned by the lower computer 20, and the lower computer 20 is further configured to return the success message, and to run the program from starting point according to the run-program request, thus ensuring the normal running of the subsequent programming.

In one embodiment, the upper computer 10 is a user operation interface, and the lower computer 20 is an introductory program of the single chip microcomputer.

In one embodiment, the bus network comprises a CAN network, a SCI network, and so on.

According to an embodiment of the present disclosure, an upper computer for programming a program in a bus network is provided. The bus network comprises a plurality of layers of nodes. The upper computer is configured to: analyze a program file to be programmed to obtain programming data of the program file and to obtain a storage address corresponding to the data, broadcast a routing request message and receive responding messages returned from a plurality of lower computers, analyze the responding messages to obtain an operating state of each node among the plurality of layers of nodes; and receive a selected node to be programmed, activate the selected node and transmit the data and the storage address to a single chip microcomputer corresponding to the selected node when the operating state of each node is a forwarding state, in which the plurality of lower computers each corresponds to one node in the bus network.

In one embodiment, each lower computer is configured to receive the routing request message sent by the upper computer and to return the responding message according to the routing request message, and to store the data in a memory of the single chip microcomputer according to the storage address.

In one embodiment, the upper computer is further configured to send a program running request according to a success message returned by the lower computer.

In one embodiment, the upper computer is a user operation interface.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for programming nodes in a bus network, wherein the bus network comprises a plurality of layers of nodes and the method comprises steps of:
   analyzing, by an upper computer, a program file to be programmed to obtain data of the program file and to obtain a storage address corresponding to the data;
   broadcasting, by the upper computer, a routing request message and receiving responding messages returned from a plurality of lower computers, in which each lower computer corresponds to one node in the bus network;
   analyzing, by the upper computer, the responding messages to obtain an operating state of each node among the plurality of layers of nodes;
   receiving a selected node to be programmed, activating the selected node and transmitting the data and the storage address to a single chip microcomputer corresponding to the selected node when the operating state of each node is a forwarding state; and
   storing, by the lower computer corresponding to the selected node, the data in a memory of the corresponding single chip microcomputer according to the storage address.

2. The method according to claim 1, further comprising:
   returning, by the lower computer corresponding to the selected node, a success message;
   sending, by the upper computer, a run-program request according to the success message; and
   running, by the lower computer corresponding to the selected node, a program from a starting point according to the run-program request.

3. The method according to claim 1, wherein the bus network comprises a CAN (controller area network) network and a SCI (serial communication interface) network.

4. The method according to claim 1, wherein the upper computer is a user operation interface, and the lower computer is an introductory program of the single chip microcomputer.

5. A system for programming nodes in a bus network, wherein the bus network comprises a plurality of layers of nodes, and the system comprises:
   a plurality of lower computers; and
   an upper computer, wherein the upper computer is configured to analyze a program file to be programmed to obtain data of the program file and to obtain a storage address corresponding to the data, to broadcast a routing request message and receive responding messages returned from the plurality of lower computers, to analyze the responding messages to obtain an operating state of each node among the plurality of layers of nodes, to receive a selected node to be programmed, and to activate the selected node and transmit the data and the storage address to a single chip microcomputer corresponding to the selected node when the operating state of each node is a forwarding state,
   wherein each lower computer corresponds to one node in the bus network, and is configured to receive the routing request message sent by the upper computer and to return the responding message according to the routing request message, and to store the data in a memory of the single chip microcomputer according to the storage address.

6. The system according to the claim 5, wherein the upper computer is further configured to send a run-program request according to a success message returned by the lower computer, and the lower computer is further configured to return the success message, and to run a program from a starting point according to the run-program request.

7. The system according to the claim 5, wherein the bus network comprises a CAN (controller area network) network and a SCI (serial communication interface) network.

8. The system according to the claim 5, wherein the upper computer is a user operation interface, and the lower computer is an introductory program of the single chip microcomputer.

9. An upper computer for burning a program in a bus network, wherein the bus network comprises a plurality of layers of nodes, and the upper computer is configured to:
   analyze a program file to be burned to obtain data of the program file and to obtain a storage address corresponding to the data,
   broadcast a routing request message and receive responding messages returned from a plurality of lower computers,
   analyze the responding messages to obtain an operating state of each node among the plurality of layers of nodes; and
   receive a selected node to be burned, activate the selected node and transmit the data and the storage address to a single chip microcomputer corresponding to the selected node when the operating state of each node is a forwarding state,
   in which the plurality of lower computers each corresponds to one node in the bus network.

10. The upper computer according to claim 9, wherein each lower computer is configured to receive the routing request message sent by the upper computer and to return the responding message according to the routing request message, and to store the data in a memory of the single chip microcomputer according to the storage address.

11. The upper computer according to claim 9, wherein the upper computer is further configured to send a run-program request according to a success message returned by the lower computer.

12. The upper computer according to the claim 9, wherein the upper computer is a user operation interface.

13. The method of claim 1, wherein the bus network is a bus network of a distributed battery management system, and the plurality of layers of nodes comprises a third layer comprising a plurality of collectors, a second layer comprising a plurality of assistant controllers and a first layer comprising a main controller.

14. The method of claim 13, wherein each collector corresponds to a single chip microcomputer, each single chip microcomputer corresponds to a lower computer, and the lower computer is an introductory program of the single chip microcomputer.

15. The system of any one of the claims 5, wherein the bus network is a bus network of a distributed battery management system, and the plurality of layers of nodes comprises a third layer comprising a plurality of collectors, a second layer comprising a plurality of assistant controllers and a first layer comprising a main controller.

16. The system of claim 15, wherein each collector corresponds to a single chip microcomputer, each single chip microcomputer corresponds to a lower computer, and the lower computer is an introductory program of the single chip microcomputer.

* * * * *